United States Patent [19]

Sollich

[11] Patent Number: 4,548,158

[45] Date of Patent: Oct. 22, 1985

[54] DEVICE FOR APPLYING A FLOWABLE FAT COMPOSITION TO OBJECTS

[75] Inventor: Helmut Sollich, Bad Salzuflen, Fed. Rep. of Germany

[73] Assignee: Sollich GmbH & Co. KG, Bad Salzuflen, Fed. Rep. of Germany

[21] Appl. No.: 576,842

[22] Filed: Feb. 3, 1984

[30] Foreign Application Priority Data

Oct. 5, 1983 [DE] Fed. Rep. of Germany ....... 3336259

[51] Int. Cl.$^4$ ............................................... B05C 5/00
[52] U.S. Cl. ...................................... 118/24; 118/324; 118/DIG. 4
[58] Field of Search .................... 118/24, DIG. 4, 324

[56] References Cited

U.S. PATENT DOCUMENTS 824,202  6/1906  Peters ............................ 118/24 X
1,606,721 11/1926 Rihl ............................... 118/24 X

FOREIGN PATENT DOCUMENTS 2738894  3/1979  Fed. Rep. of Germany ........ 118/24

Primary Examiner—John P. McIntosh
Attorney, Agent, or Firm—Alan H. Levine

[57] ABSTRACT

A device for applying a flowable fat composition to objects, especially chocolate compositions on candy, baked goods, etc. The chocolate composition is kept in a container, which has at its lower end an outlet opening above the objects to be coated. A roller rotates at relatively high speed in the opening. That part of the surface of the roller, which is immersed in the container, picks up chocolate composition and releases it at approximately its lowest point. The thickness of the chocolate composition film, transported on the roller, is determined by an edge fixed to the container. The separation of the composition film from the roller is aided by a doctor blade. The thickness of the composition film on the roller, the rotational speed of the roller, and the distance between the roller and objects to be coated are selected, so that a bubble-free composition film is transported on the roller and new bubbles do not form in the chocolate composition on the way from the roller to the objects to be coated.

4 Claims, 1 Drawing Figure

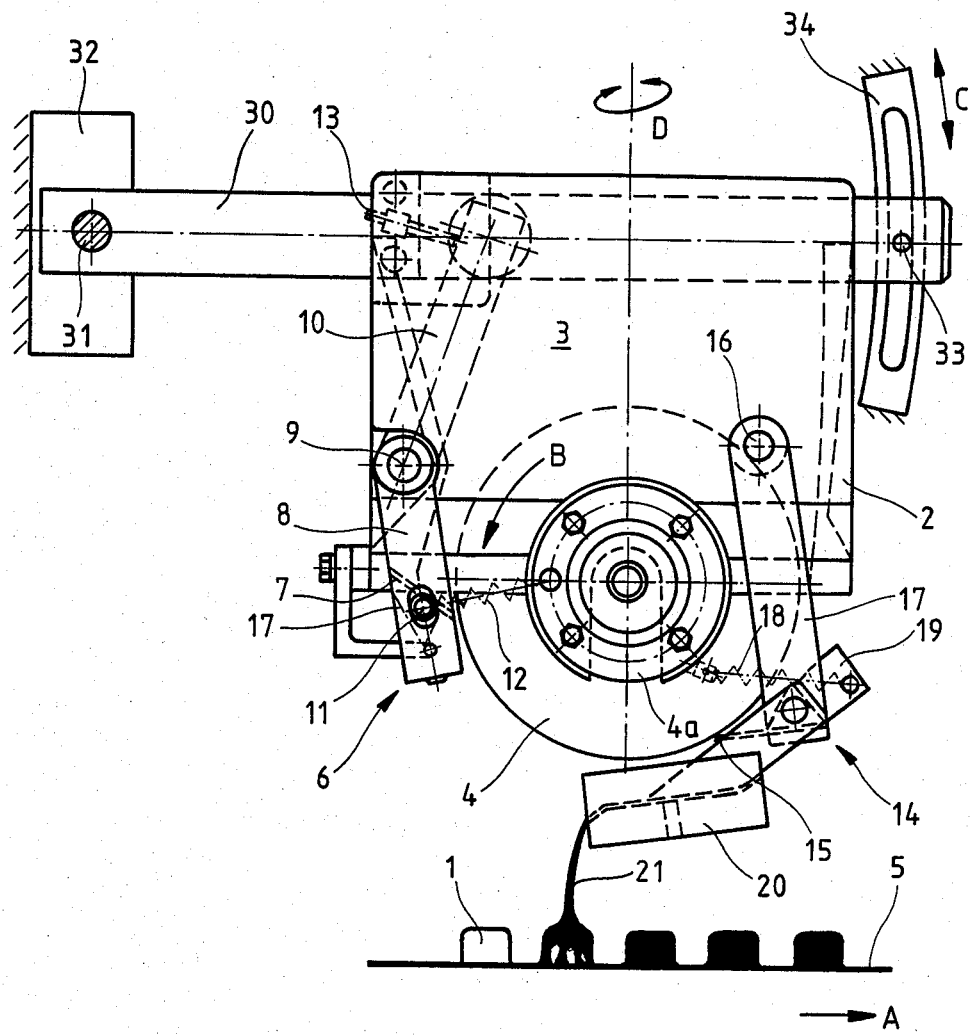

DEVICE FOR APPLYING A FLOWABLE FAT COMPOSITION TO OBJECTS

The invention relates to a device for applying a flowable fat composition, for example, a chocolate composition, to objects such as candy, baked goods, and the like.

Such a device for applying a chocolate composition is disclosed in the German Offenlegungsschrift 2,738,894, wherein a roller carries a layer of chocolate composition from a storage tank to a point where it is applied to objects to be coated. In this device, it is important, on the one hand, that the lowest point of the roller is relatively close to the top of the object on which the chocolate composition is to be applied and, on the other, that a doctor blade is installed behind the lowest point of the roller in the circumferential direction, and relatively close to this lowest point.

It is an object of this invention to be able to provide those objects, which have a very jagged surface, with a continuous chocolate coating. By means of the known device, an effect is achieved, which is described there as a "washedin" effect and in which the chocolate composition is washed into depressions, undercuts, and the like of the objects to be coated.

It has now turned out that, with a relatively slight change in the previously known device, a completely different effect is achieved, which played no role, or at most a subordinate role, at the time that the previous device was developed, but on the other hand is of considerable importance now.

The trend of prices for various raw materials has been very different in recent years. A particularly large increase occurred in the price of cocoa butter, for which prices have risen by a multiple within a few years. This price increase cannot be passed on fully to the ultimate consumer because of the strong competition between manufacturers of chocolate products. In order to be able to absorb, at least somewhat, the exploding prices in the cocoa butter market, chocolate products have come on the market increasingly in which the proportion of cocoa butter is constantly decreased and the proportion of other chocolate components, the prices of which have increased more slowly, is correspondingly higher. As a result, chocolate compositions whose flowability is relatively low and whose viscosity is relatively high are used in constantly increasing numbers.

Air bubbles, which are necessarily incorporated into these compositions as they are being prepared to coat objects, are released less rapidly from compositions of higher viscosity, whereas the release of bubbles presents no problem in compositions of lower viscosity. Air bubbles are particularly undesirable in chocolate compositions which are used to coat objects, because after the chocolate is applied, they are released in the form of a thin film during the solidification of the chocolate composition, breaking up the surface of the chocolate by forming pin holes and making the surface unattractive and less durable. Removal of air bubbles before the chocolate composition is applied is particularly desirable, or even necessary, especially in chocolate compositions which are used to coat objects.

It has already been proposed that the chocolate composition be treated in special equipment before it is applied, in order to force the air bubbles to leave the chocolate composition. However, by so doing, the manufacturing costs are raised not insignificantly and the chocolate product price rises, which consequently become necessary, have frequently not been acceptable in the market place because of the aforementioned competitive situation. In an endeavor to achieve comparable effects in a more inexpensive manner, so-called bubble breakers have already been proposed. The air bubbles are no longer removed from the chocolate composition, but are shattered into the smallest possible bubbles and distributed uniformly in the chocolate composition. This process is however feasible only with a particular thickness of chocolate composition. With very thin layers, small air bubbles still emerge from the surface of the chocolate, breaking it up and causing the disadvantageous consequences described above. Moreover, the shattering of air bubbles in chocolate compositions and similar viscous compositions leads to temperature increases, which are undesirable and possibly even unacceptable.

The change according to this invention in the previously known equipment results in air bubbles being largely removed from a fat composition when objects are coated with this fat composition. The distance between the edge, fixed in the container, and the surface of the roller lies within the range of 0.2 to 3.0 mm, the roller is driven at a high speed of up to several hundred revolutions per minute, and especially at 50 to 800 rpm or a circumferential velocity of 20 to 320 m/min, and the length of the fat composition curtain is so determined, that an essentially smooth curtain of fat composition is formed.

As a consequence of this inventive solution, a very high shear effect is achieved in a very simple manner in the region of the edge attached to the container. When this shear effect acts on the fat composition, which is present as a very thin film on the roller, all air bubbles in the composition are torn apart and expelled from the fat composition film. The fat composition, which reaches the region of the doctor blade, is then completely free of bubbles; the fat composition film, which flows from the doctor blade, is smooth and free of folds and bubbles, and hence a bubble-free, homogeneous, and smooth coating of the fat composition is achievable. The thickness of the fat composition film, to be applied to the objects, can be fixed by fixing the delivery angle of the doctor blade. If necessary, the delivery angle of the doctor blade should be so adjustable that a cascadelike discharge of the composition from the doctor blade is achieved, which does not incorporate air bubbles into the previously bubble-free fat composition.

The speed of the "curtain roller", or its circumferential velocity, depends on the amount of composition which is desired or required in the fat composition curtain and which is necessary for coating the objects adequately. At lower operating speeds, i.e., speeds at which the objects pass under the coater, lesser amounts of fat composition and a lower circumferential velocity are adequate. The higher the operating speed, the higher is the circumferential velocity which the roller must have in order to bring down an adequate amount of fat composition. In a particular case, the circumferential velocity of the curtain roller is chosen so as to maintain the absence of bubbles, achieved as a result of the gradient during the application of the fat composition on the roller. In this connection, no thought has been given for the time being to any additional effect of the destruction of bubbles. Such an effect can be obtained only above a minumum roller velocity. However, depending upon the required throughput of fat composition, this minimum velocity should always be exceeded by far.

An illustrative example of a device according to the invention is shown in the accompanying drawing.

Tempered chocolate, as an example of a fat composition, is conveyed from a kettle of relatively large volume to a storage tank 2, arranged above the objects 1, which are to be coated. The adjustable level of the tempered chocolate composition 3 in the storage tank 2 is kept constant during the processing operation by continuously supplying appropriate amounts of chocolate composition.

Curtain roller 4 protrudes into storage tank 2. The direction of rotation B of curtain roller 4 preferably is the same as the direction of movement of conveyor belt 5, which is constructed in the form of a lattice belt and on which the objects to be coated 1 are passed continuously under curtain roller 4. The direction of rotation of the curtain roller 4 and the direction of the conveyor belt can however also be mutually opposite or, if necessary, the application device can be turned about a vertical axis by 180° relative to the conveyor belt.

The chocolate composition is carried along due to the fact that it adheres to the surface of the roller. It commences to become detached from the roller in the region of the lowest point of the roller surface and reaches the objects 1, below curtain roller 4, so as to coat them. Excess chocolate composition trickles down the objects, through lattice belt 5 and reaches the kettle for tempering the chocolate, which is arranged below the lattice belt.

The thickness of the chocolate composition layer on the surface of curtain roller 4 is determined by a preliminary doctor blade 6, which forms an edge attached to the container. The preliminary doctor blade has a knife edge 7, which runs parallel to curtain roller 4 and whose distance from the surface of the curtain roller determines the outlet cross section for the chocolate composition from storage tank 2. The distance and, with it, the outlet cross section can be changed owing to the fact that the two ends of the cutting edge 7 are held between two levers 8, which are seated on shaft 9, which is mounted, rigidly but rotatably, in a direction parallel to curtain roller 4 and to which a further lever 10 is assigned. Between the stationary bearing shields 4a, the curtain roller 4 and pin 11 of lever 8, flat spiral springs 12 are arranged, which pull the knife edge 7 of the preliminary doctor blade 6 in the direction of the surface of the curtain roller 4. The extent of the possible approach of the cutting edge to the surface of the roller is limited by an adjustable stop 13, against which lever 10 is held by springs 12. The preliminary doctor blade 6 is adjusted as required by the particular operating conditions. In any case, the thickness of the layer of chocolate composition on curtain roller 4 should preferably lie between 0.2 and 3.0 mm, in order to achieve the desired effect when using the present invention.

The curtain roller is rotated between the bearing plates with the help of a suitable drive, which can be conventional and is therefore not shown. The drive drives curtain roller 4 at a high speed of preferably several hundred revolutions per minute.

A further doctor blade 14 is provided in order to promote removal of the chocolate film from the surface of curtain roller 4. Like the preliminary doctor blade, this doctor blade 14 has a knife edge 15, which runs parallel to curtain roller 4 and whose ends are held between two levers 17, which are hinged on pins 16. Flat spiral springs 18, which hold doctor blade 15 with a predetermined force against the surface of curtain roller 4, are provided between bearing plates 4a and levers 17. By these means, chocolate is prevented from being carried along on the surface of curtain roller 4 beyond the line at which doctor blade 15 contacts curtain roller 4. The supports 19, on which springs 18 on levers 17 are held, are adjustable so that the contacting force can be adjusted.

Knife edge 15 guides the chocolate composition stripped from curtain roller 4 onto discharge chute 20, from which the chocolate composition 21 drains onto the objects to be coated. Knife edge 15, roller 4 and discharge chute 20 can be arranged relative to each other in such a way that the chocolate composition stripped as a thin film from the curtain roller, can be dammed somewhat and run off cascade-like, but nevertheless bubble-free, from discharge chute 20, so that the objects can be coated with a relative thick layer of chocolate. If necessary, the angle of inclination between knife edge 15 and discharge chute 20 is adjustable. Above all however, the chocolate composition runs off as a smooth, bubble-free curtain.

A seal ensures that no chocolate leaves the storage tank between curtain roller 4 and the edge of the opening at the lower end of the storage tank opposite the preliminary doctor blade 6. Similarly, there are seals to prevent chocolate composition escaping in the region of the end plates of the curtain roller. For this purpose however, conventional seals are used, which are therefore not shown.

The distance between the lowest point of curtain coater 4 and the objects to be coated should be as small as possible, so that air bubbles do not enter the curtain as it falls down, in cascade fashion if necessary. Doctor blade 14 should be arranged in the region of the lowest point of the curtain roller. It is however of no significance to the object of the invention whether the doctor blade acts at this point, ahead of it, or behind it. In order to be able to adjust the system so that a film, which is largely free of bubbles due to shearing action, runs down from doctor blade 14 or chute 20, the application device as a whole is vertically adjustable in two opposite directions relative to conveyor belt 5, as indicated by double arrow C. Finally, the device can be designed to tilt about a vertical axis corresponding to double arrow D, while the direction of the conveyor belt remains the same.

The device can be constructed to be adjustable in the vertical direction according to double arrow C, so that the length of the fat composition curtain can be varied. This can be done, for example, by attaching the device to a horizontal stand 30 in such a way that at one end it is supported by means of a shaft 31 as a hinge on bracket 32, and the other end is guided by pin 33 in slot guidance device 34. Pin 33 is attached to stand 30; it is adjustable in the slot guidance device 34, but can be fixed in any position relative to slot guidance device 34.

In summary, the invention can be defined once again as follows:

The object of the invention is a device for applying a flowable fat composition on objects, especially chocolate compositions on candy, baked goods, etc. The chocolate composition is kept in a container, which has at its lower end an outlet opening above the objects to be coated. A roller rotates at relatively high speed in the opening. That part of the surface of the roller, which is immersed in the container, picks up chocolate composition and releases it again at approximately its lowest point. The thickness of the chocolate composition film, transported on the roller, is determined by an edge fixed to the container. The separation of the composition film from the roller is aided by a doctor blade. The thickness of the composition film on the roller, the rotational speed of the roller and the distance between roller and objects to be coated are selected, so that a bubble-free composition film is transported on the roller and new bubbles do not occur in the chocolate composition on the way from the roller to the objects to be coated.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A device for applying a flowable fat composition to objects, comprising:

a storage tank for the flowable fat composition, the storage tank having an opening, a roller rotatable with respect to the storage tank, a portion of the roller surface, at any one time, covering the storage tank opening so that it will dip into a fat composition within the storage tank, means defining an edge of the container opening, that edge being spaced from the roller a distance in the range between 0.2 and 3.0 mm, and that edge and the roller determining the thickness of the fat composition carried by the roller out of the storage tank, a doctor blade circumferentially spaced, along the surface of the roller, from the edge-defining means, the doctor blade engaging the roller surface for stripping the layer of fat composition from the roller, means for rotating the roller at a speed between 50 and 800 rpm, so that its circumferential velocity is between 20 and 320 m/min, whereby the shear effect on the fat composition in the region between said edge and the roller serves to eliminate air bubbles from the composition, and a discharge chute beneath the doctor blade for directing the fat composition stripped from the roller on to the objects to be coated.

2. A device as defined in claim 1 including means for adjusting the edge-defining means so as to vary the distance between said edge and the roller.

3. A device as defined in claim 1 including a conveyor for carrying objects to be coated with the fat composition, and means for adjusting the spacing of the doctor blade above the conveyor.

4. A device as defined in claim 1 including a conveyor for carying objects to be coated with the fat composition, and means for adjusting the spacing of the storage tank, the roller, and the doctor blade, as a unit, above the conveyor.

* * * * *